United States Patent
Lenz

(10) Patent No.: US 6,530,172 B2
(45) Date of Patent: Mar. 11, 2003

(54) APPARATUS FOR KILLING INSECTS

(76) Inventor: Michael Lenz, 1235 Highpoint La., Waukesha, WI (US) 53189

(*) Notice: Subject to any disclaimer, the term of this patent is extended or adjusted under 35 U.S.C. 154(b) by 0 days.

(21) Appl. No.: 09/894,986

(22) Filed: Jun. 28, 2001

(65) Prior Publication Data
US 2003/0000126 A1 Jan. 2, 2003

(51) Int. Cl.⁷ .................................................. A01M 1/22
(52) U.S. Cl. ........................................................ 43/112
(58) Field of Search ........................... 43/107, 112, 113

(56) References Cited

U.S. PATENT DOCUMENTS

| | | | |
|---|---|---|---|
| 3,041,773 A | 7/1962 | Gagliano | |
| 3,319,374 A | 5/1967 | Gawne | |
| 3,796,001 A | 3/1974 | Jackson | |
| 4,182,069 A | 1/1980 | DeYoreo | |
| 4,454,677 A | 6/1984 | Chuang | |
| 4,523,404 A | 6/1985 | DeYoreo | |
| 4,696,126 A | 9/1987 | Grothaus et al. | |
| 4,852,296 A | 8/1989 | Swanson et al. | |
| 4,856,226 A | 8/1989 | Taylor | |
| 4,891,904 A | 1/1990 | Tabita | |
| 4,907,366 A | 3/1990 | Balfour | |
| 4,908,979 A | 3/1990 | Hostetter | |
| 4,951,414 A | 8/1990 | Mewissen | |
| 5,020,270 A | 6/1991 | Lo | |
| 5,205,064 A * | 4/1993 | Nolen | 43/112 |
| 5,241,779 A | 9/1993 | Lee | |
| 5,255,468 A | 10/1993 | Cheshire, Jr. | |
| 5,301,458 A | 4/1994 | DeYoreo et al. | |
| 5,329,725 A | 7/1994 | Bible | |
| 5,335,446 A | 8/1994 | Shigetoyo | |
| 5,595,018 A | 1/1997 | Wilbanks | |
| 5,647,164 A * | 7/1997 | Yates | 43/139 |
| 5,669,176 A * | 9/1997 | Miller | 43/139 |
| 5,799,436 A * | 9/1998 | Nolen et al. | 43/112 |
| 5,813,166 A * | 9/1998 | Wigton et al. | 43/107 |
| 6,050,025 A | 4/2000 | Wilbanks | |
| 6,055,766 A | 5/2000 | Nolen et al. | |
| 6,088,949 A * | 7/2000 | Nicosia et al. | 43/107 |
| 6,145,243 A * | 11/2000 | Wigton et al. | 43/139 |
| 6,199,316 B1 | 3/2001 | Coventry | |
| 6,272,790 B1 * | 8/2001 | Paganessi et al. | 43/107 |
| 6,286,249 B1 * | 9/2001 | Miller et al. | 43/139 |

* cited by examiner

Primary Examiner—Thomas Price
(74) Attorney, Agent, or Firm—James Earl Lowe, Jr.

(57) ABSTRACT

An apparatus for killing insects, the apparatus including an electrical mechanism for killing insects, an inner shell, the inner shell being surrounded by the electrical mechanism, and a mosquito attracting device within the inner shell. The insect attracting device includes a fan, a heat source, and a source of $CO_2$. The inner shell has a plurality of openings in the inner shell for ejecting heated air and $CO_2$ from within the inner shell, the openings being formed by indentations in the surface of the inner shell, each indentation being open at one end so as to form an opening which lies substantially perpendicularly to the extending axis of the inner shell. The insect attracting device further includes a mechanism for closing the source of $CO_2$ and for stopping the fan when the temperature within the inner shell goes below the temperature. The insect attracting device further includes a moisture source, and an insect attractant. The apparatus for killing insects also includes a mechanism for opening the source of $CO_2$ and for starting the fan when the temperature within the inner shell reaches a certain temperature.

16 Claims, 3 Drawing Sheets

APPARATUS FOR KILLING INSECTS

FIELD OF THE INVENTION

The present invention relates generally to an apparatus for killing insects by electrifying the insects. More particularly, the present invention is directed a device used to attract the insects to an electrified wire network.

BACKGROUND OF THE INVENTION

Within the recent past the use of mosquito killing devices has become well known in the prior art. Known insect or mosquito attracting and killing devices typically use light for attracting target insects. Target insects drawn towards the apparatus contact an electrocution grid for subsequent eradication. By way of example, U.S. Pat. Nos. 4,182,069, 4,523,404 and 5,301,458 as well as U.S. Pat. Nos. 5,020,270, 3,319,374, 3,041,773, 4,454,677 and 4,852,296 all employ light for attracting insects towards an electrocution grid.

U.S. Pat. No. 5,255,468 issued to Cheshire, Jr. discloses an insect attracking and capturing apparatus having a light source to attract insects and a fan to create an air current for capturing the insects in the air current created and delivering the insects to a electrified grid for electrocution.

U.S. Pat. No. 4,951,414 issued to Mewissen discloses a device for electrocuting insects having a housing with a low pressure, mercury vapor discharge light therein. An electrically connected ballast for illuminating the mercury vapor lamp also generates voltage for electrifying the insect eradication grid.

Other interesting devices of general relevance include U.S. Pat. No. 5,205,064 issued to Nolen. It discloses a generally cylindrical device having a pressurized canister and a cam mechanism for periodically discharging the contents of the canister to attract insects for electrocution. U.S. Pat. No. 4,696,126 issued to Grothaus, et al., shows a device that uses an electric grid to temporarily shock flying insects and trap them on a sticky paper.

Some known devices employ different attractants. U.S. Pat. No. 4,891,904 issued to Tabita discloses a heating device for electrocuting mosquitoes that has a passive heating assembly disposed within an interior chamber. U.S. Pat. No. 5,241,779 issued to Lee discloses an apparatus for collecting and killing insects having a passive heat source, a sweet liquid attractant, and a killing grid for electrocuting crawling insects.

U.S. Pat. No. 6,050,025 issued to Wilbanks discloses an insect killing system including a fan and an inner shell with openings in the shell.

SUMMARY OF THE INVENTION

One of the principal features of this invention is to provide an efficient and cost effective apparatus for attracting and killing nuisance insects, such as mosquitoes, yellow jackets and houseflies. This is accomplished by simulating the $CO_2$, heat, moisture and smell of a mammal in order to attract the insects.

Another of the features of the invention is to provide an insect killing apparatus made mostly of simple plastic materials (PVC, ABS), except for the electrified wire network.

An apparatus for killing insects, the apparatus including electrical means for killing insects, an inner shell, the inner shell being surrounded by the electrical means, and a mosquito attracting device within the inner shell. The insect attracting device includes a fan, a heat source, and a source of $CO_2$. The inner shell has a plurality of openings in the inner shell for ejecting heated air and $CO_2$ from within the inner shell, the openings being formed by indentations in the surface of the inner shell, each indentation being open at one end so as to form an opening which lies substantially perpendicularly to the extending axis of the inner shell. The attracting device further includes means for closing the source of $CO_2$ and for stopping the fan when the temperature within the inner shell goes below said temperature. The insect attracting device further includes a moisture source, and an insect attractant.

An apparatus for killing insects, the apparatus including means for opening the source of $CO_2$ and for starting the fan when the temperature within the inner shell reaches a certain temperature.

Other features and advantages of the invention will become apparent to those skilled in the art upon review of the following detailed description, claims and drawings in which like numerals are used to designate like features.

Figure 1:
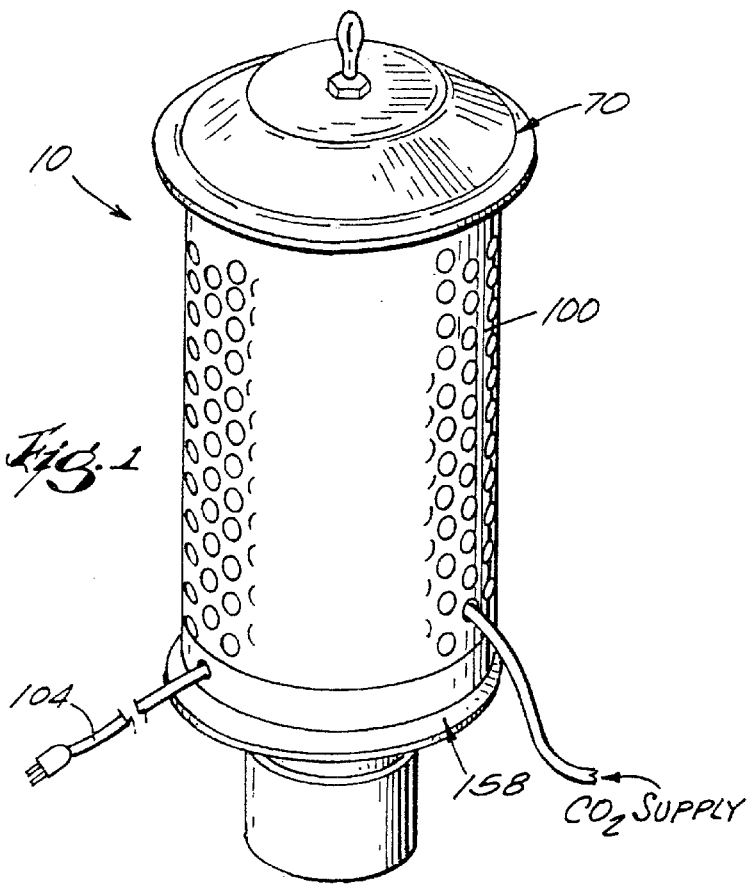
FIG. 1 is a perspective view of a portable insect killing apparatus embodying various of the features of this invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use of "including" and "comprising" and variations thereof herein is meant to encompass the items listed thereafter and equivalents thereof as well as additional items and equivalents thereof. The use of "consisting of" and variations thereof herein is meant to encompass only the items listed thereafter and the equivalents thereof.

DETAILED DESCRIPTION OF THE PREFERRED EMBODIMENT

Figure 2:
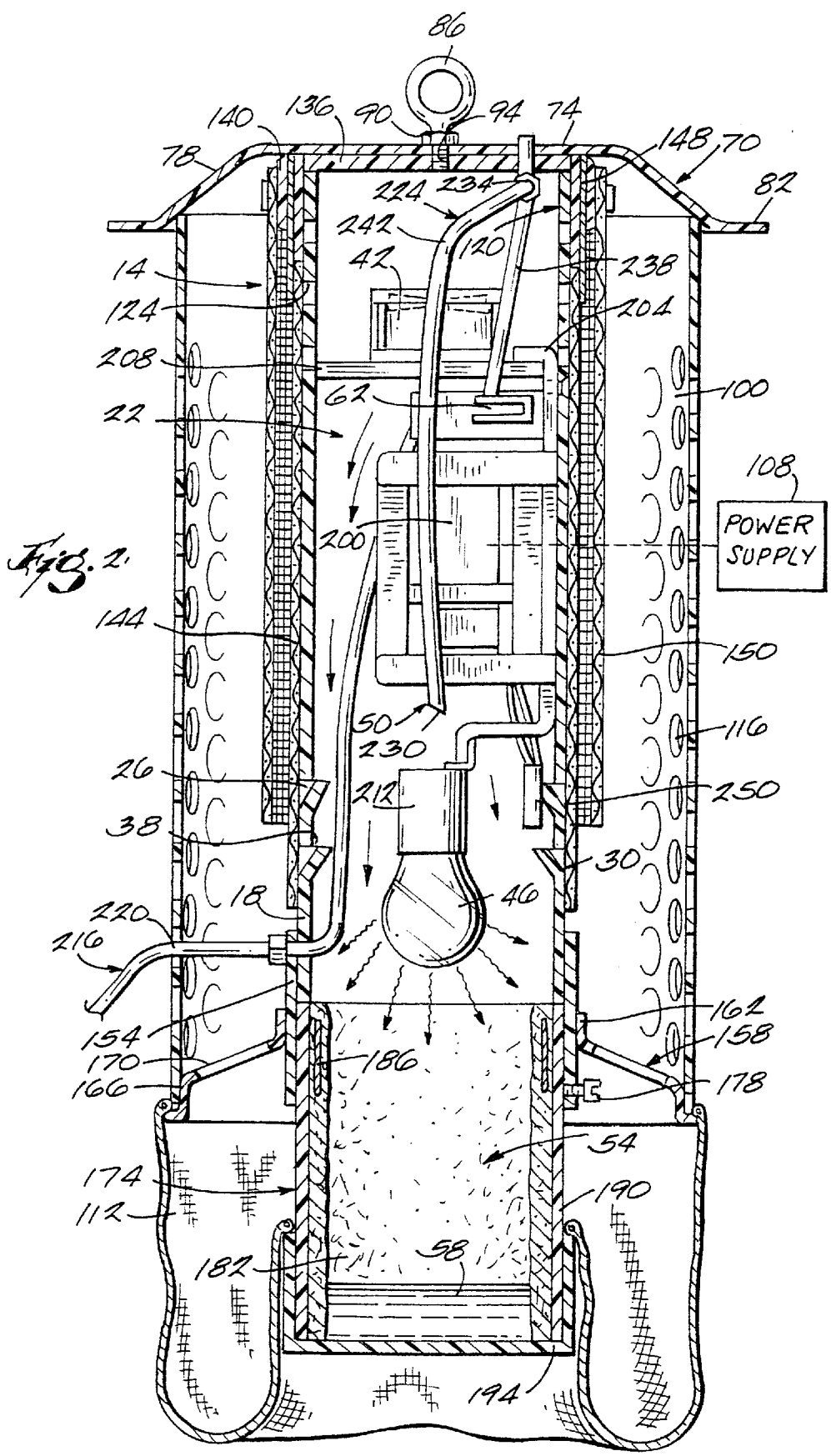
FIG. 2 is a cross-sectional view of the mosquito killing apparatus shown in FIG. 1.

As illustrated in the drawings, and more particularly as shown in FIGS. 1 and 2, the invention comprises an apparatus 10 for killing insects, the apparatus including electrical means 14 for killing insects, an inner shell 18 within the electrical means 14, and a mosquito attracting device 22 within the inner shell 18.

Figure 3:
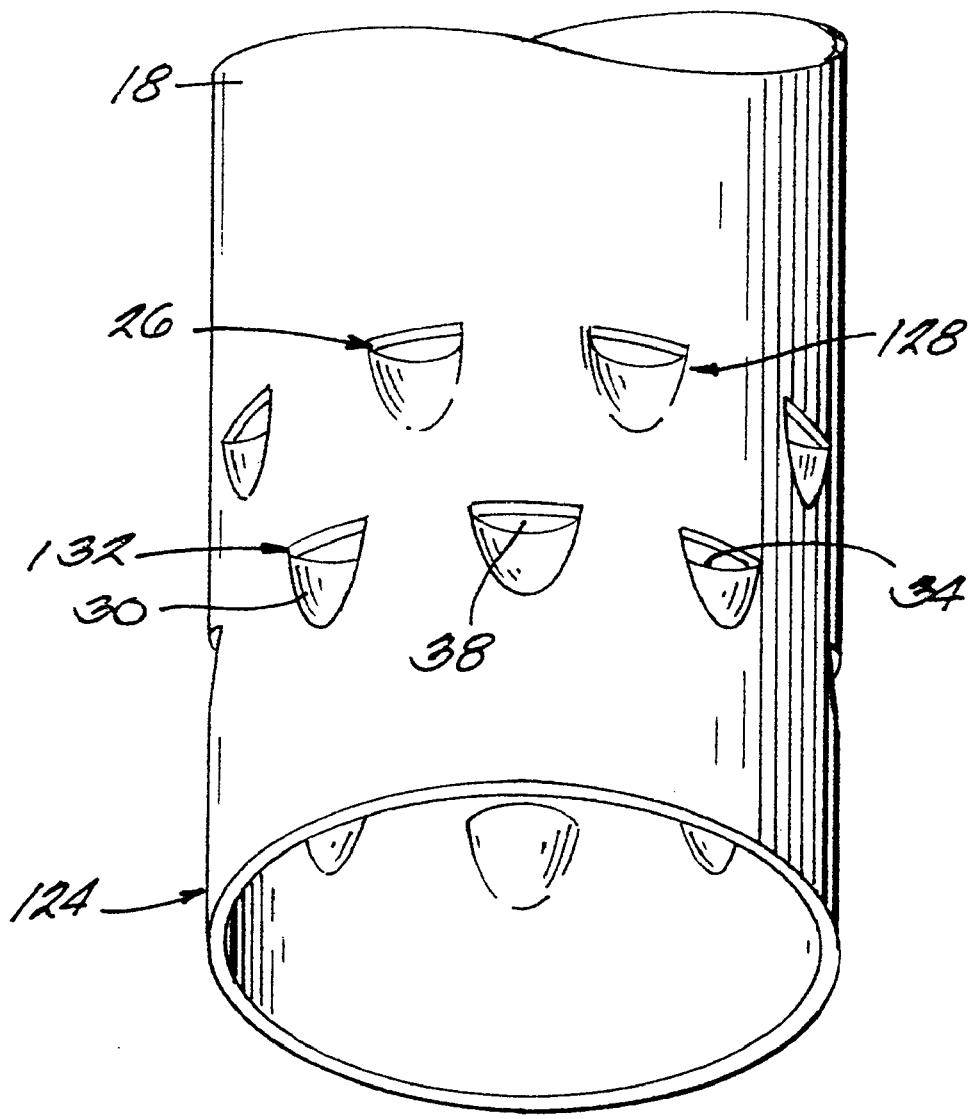
FIG. 3 is a perspective view of an inner shell within the mosquito killing apparatus. The inner shell is shown at an angle to expose the horizontal openings in the inner shell.

More particularly, as shown in FIGS. 2 and 3, the inner shell 18 has a plurality of openings 26 in the inner shell 18 for ejecting heated air, moisture and $CO_2$ from within the inner shell 18, the openings 26 being formed by indentations 30 in the surface of the inner shell 18, each indentation 30 being open at one end 34 so as to form an opening 38 which lies substantially perpendicularly to the extending axis of the inner shell 18.

Still more particularly, as shown in FIG. 2, the insect attracting device 22 includes a fan 42, a heat source 45, and a source of $CO_2$ 50. More particularly, the insect attracting device further includes a moisture source 54, and an insect attractant 58.

Figure 4:
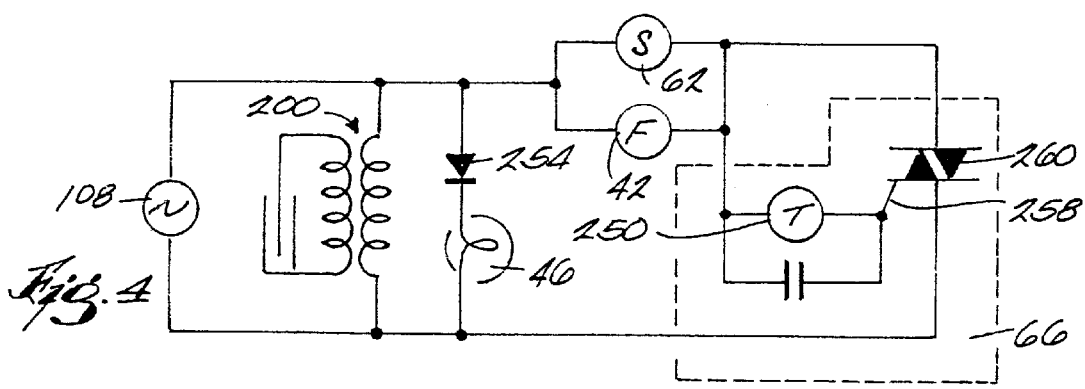
FIG. 4 is a schematic of the electrical system of the invention.

As shown in FIG. 4, the apparatus 10 further includes means for opening the source of $CO_2$ in the form of a solenoid valve 62 and means 66 for starting the fan 42 and opening the solenoid valve 62 when the temperature within the inner shell reaches a certain temperature. The means 66 also close the solenoid valve 62 and stops the fan 42 when the temperature within the inner shell 18 goes below said temperature.

Still more particularly, as shown in FIGS. 1 and 2, the apparatus 10 includes a roof 70. The roof 70 includes a central flat portion 74, an outer downwardly curved portion 78 and an outer horizontal flange 82. The apparatus 10 also includes means for hanging the apparatus from a ceiling comprising an eye bolt 86 and a locking washer 90, the eye bolt 86 being secured in a threaded bore 94 in the top of the apparatus. The locking washer 90 is located between the eye bolt 86 and the roof 70 in order to lock the eye bolt 86 in place.

The apparatus further includes an outer protective shell or shield 100, means such as a power cord 104 adapted to connect the attracting device 72 to a power supply 108, and means in the form of the a bag 112 made of netting for catching dead insects. The cylindrical outer protection shield 100 has a plurality of large openings 116 that easily permit insects to pass through and is attached to the downwardly sloping outer portion 78 of the roof 70. Both the outer protective shield 100 and the roof 70 are made of insulating plastic.

The inner shell 18 is in the form of a cylinder and has a top end 120 and a bottom end 124. The inner shell 18 is painted black in color in order to attract the insects. The top end of the shell includes a plurality of openings 124 for permitting air to be drawn inside the inner shell 18. In other embodiments, other types of openings can be used. Near the bottom end of the inner shell 18, the inner shell 18 has the plurality of gas ejecting openings 26. More specifically, there are eight openings in one horizontal row 128 around the inner shell 18 and eight openings in a second row 132. The openings in the second row 132 are spaced between and below the openings in the first row 128. Each opening 132 is formed by a cut in the inner shell 18 with the material below the cut being indented inwardly towards the center of the inner shell 18. Each opening thus has the horizontal hole 38 into the interior of the inner shell 18. Each hole 38 permits gas to be ejected from the inside of the inner shell 18 in a downward and outward fashion. The indentations 30 that form the opening 38, however, help prevent horizontal entry into the inner shell, such as by rain, wind or insects.

The mosquito killing system or apparatus electrical means 14 surrounding the inner shell 18 is in the form of an outer network of electrified low voltage wires 144 and 150 in a spaced apart relationship. The wire network dehydrates and kills any insects which pass through network of wires.

The wire network 14 is positioned around the inner shell 18 by means of a cap 136 and an upper collar 140. More specifically, the wire network includes the cylindrical inner grid 144 of wires made from galvanized hardware cloth closely adjacent to the outside surface of the inner shell 18. Placed around the top of the inner grid on the outside of the inner grid 144 circumferentially around the inner shell 18 is an insulating, high temperature, plastic sheet 148. The sheet 148 covers a portion of the end of the inner grid 144. The plastic sheet 148 is held on the inner shell 18 by the upper collar 140. The upper collar 140 is held on the cap 136 fastened such as by glue to the top of the inner shell 18 by an inwardly tapered fit between the collar 140 and the cap 136. The plastic sheet 148 forms an extra current creep length between the inner grid 144 and the outer grid 150. The outer grid 150 is mounted on the outside of the upper collar 140 by means such as rivets. The outer grid 150 is held in a spaced position relative to the inner grid 144 by the upper collar 140 and the rigidity of the outer grid 150.

Attached by means such as glue to the outside of the bottom of the inner shell 18, below the openings 26, is a plastic lower collar 154. The plastic collar 154 forms a lower portion of the inner shell 18. In other less preferred embodiments, the lower collar 154 can be omitted. An annular bag support bracket 158 is mounted on the outside surface of the lower collar 154. This support bracket 158 includes an inner ring 162, an outer ring 166, and tabs 170 extending between the inner and outer rings to support the outer ring 166 relative to the inner ring 162. and to create openings between the rings forming the support bracket 158. The support bracket 158 is held on the lower collar 154 by means such as glue.

The bag 112 is made of netting formed in a cylinder with elastic in one end holding the one bag end on the other ring 166 of the bag support bracket 158. Elastic in the other end holds the other bag end on the cup 174 above the cup 194.

The mosquito killing apparatus 10 further includes a cup 174 for holding the liquid 58 including the mosquito attractant. The cup 174 is held in the lower collar 154 by a plastic screw 178 that extends through a threaded hole in the lower collar 154 that holds the cup 174. The screw 178 engages and holds the cup 174 in place. In other embodiments, other means for attaching the cup to the inner shell can be used, such a screw thread (not shown) in the top of the cup and in the lower collar. In the preferred embodiment, the mosquito attractant is a food grade lactic acid. In other embodiments, other attractants can be used, both for attracting mosquitoes as well as other nuisance insects. In other embodiments, a stand (not shown) can be added to receive the inner shell 18 and the cup 174 to support the apparatus 10 so the apparatus 10 can be placed on the ground.

The mosquito apparatus 10 further includes a wick 182 supported within the cup 174 which extends down into the liquid 58. The fabric wick 182 is held within the cup 174 by a retaining ring 186. The retaining ring 186 is a ring with a missing segment. The top of the wick 182 is wrapped over the retaining ring 186. The ring 186 can then be compressed inwardly, fitted inside the top of the cup 174 and then released in order to expand and hold the wick 182 inside the cup 174. The cup 174 is formed from a cylindrical portion 190 and a lower cap 194 attached to the bottom of the cylindrical portion 190. In the preferred embodiment, the cup is formed from PVC material. In other less preferred embodiments, a one-piece cup can be used, as well as being made from other materials.

The mosquito attracting device 22 comprises a bracket 204. On the upper end of the bracket 204 is an annular fan mounting support plate 208. The support plate 208 is attached to the upper end of the bracket 204. The AC fan 42 for blowing air from the top of the inner shell 18 towards the bottom is mounted on the annular support plate 208. In other embodiments, a DC fan or a variable speed fan can be used. Mounted on the bracket 204 beneath the fan 42 is the solenoid valve 62. Mounted on the bracket 204 beneath the solenoid valve 62 is an electrical transformer 200 for converting household voltage to the high voltage (4000 volts) required for the wire network 14. One end (not shown) of the high voltage side of the transformer extends to the outer grid 150 and the other end (not shown) of the high voltage side of the transformer extends to the inner grid 144. Any mosquitoes which pass between the grids thus cause current to flow between the grids. This kills the mosquitoes. Mounted on the lower end of the bracket 204 is a light socket 212. Within the light socket 212 is the 60-watt black light bulb 46 which extends away from the bracket 204 towards the bottom of the mosquito killing apparatus 10. In other less preferred embodiments, other heat sources or other light bulbs can be used.

The annular support plate 208 and the bracket 204 fit inside the top end of the inner shell 18, with the black light bulb 46 at the bottom on the inner shell 18. The bracket 204 is attached to the inner shell 18 by means such as rivets.

The mosquito attracting device 22 further includes a $CO_2$ line 216. One end of the line 216 is attached to a regulator (not shown) on a $CO_2$ source of supply, such as a $CO_2$ tank (not shown). The $CO_2$ line 216 includes a first passageway 220 in communication with the source of $CO_2$ and in communication with an inlet (not shown) to the solenoid valve 62. The $CO_2$ line 216 further includes a second passageway 224 in communication with the outlet (not shown) of the solenoid valve 62 and in communication with an opening 230 to the interior of the inner shell 18 adjacent to the black light bulb 46. The mosquito attracting device 22 further includes a variable size orifice 234 in the $CO_2$ line 216 for varying the amount of $CO_2$ that the device 22 ejects in order to attract mosquitoes. More particularly, the second passageway 224 includes a first tube 238 extending between the solenoid valve outlet and the variable size orifice mounted in the top of the mosquito killing apparatus 10. The second passageway 224 further includes a second tube 242 extending from the outlet (not shown) from the variable size orifice 234 down to adjacent the black light bulb 46. The variable size orifice 234 includes an accessible screw in the top of the mosquito killing apparatus 10 so that a user of the system can vary the size of the orifice 234 to vary the amount of $CO_2$ which is ejected. In other embodiments, the variable size orifice 234 can be included in the first passageway.

The mosquito attracting device 22 further includes a temperature switch 250 in the inner shell 18 adjacent but spaced from the black light 46. Either a creep or snap type of temperature switch 250 can be used. In either case, the switch 250 is opened when the temperature goes below a selected value and is closed when the temperature goes above a selected value. In other less preferred embodiments, other subcontrollers, such as timers, can be used to determine the on characteristics of the $CO_2$ or the fan.

As more particularly shown in FIG. 4, the mosquito killing apparatus electrical system includes an external source of power. Across the external source of supply is the transformer 200, a diode 254 in series with the black light 46 and the fan and solenoid control circuit 66. More particularly, the control circuit 66 is across the source of supply. The control circuit 66 is open when the temperature of the gasses within the inner shell 18 are below a particular temperature. In the preferred embodiment, the temperature for the control circuit 66 is 43 degrees Celsius. The control circuit 66 is closed when the temperature within the inner shell 18 rises above a particular temperature. More particularly, the control circuit 66 is opened and closed by the temperature switch 250 in parallel with a capacitor 254 and in series with a gate 258 to a triac 260. The triac 260 is in series with the solenoid and fan in parallel.

Figures 5, 6:
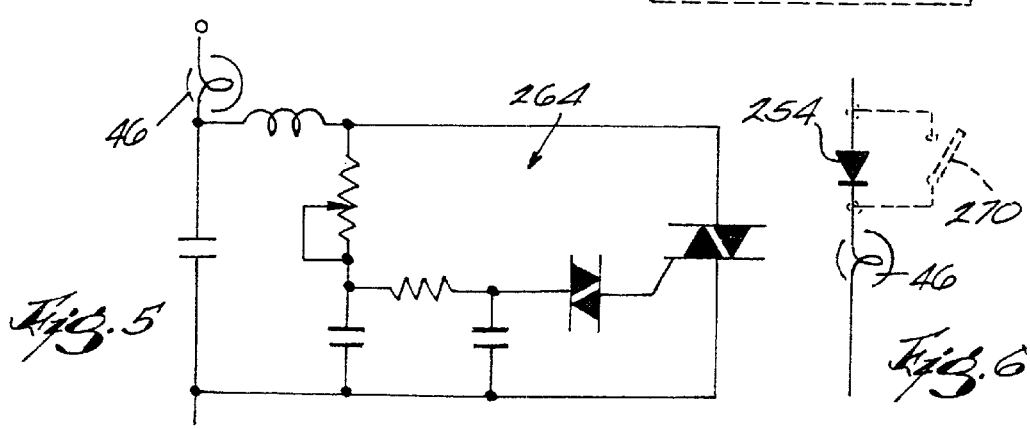
FIG. 5 is an alternative to a portion of the electrical system shown in FIG. 4.
FIG. 6 is another alternative to a portion of the electrical system shown in FIG. 4.

In an alternate embodiment, as shown in FIG. 5, a variable heat source can be used. More particularly the voltage across the light bulb 46 can be varied by a conventional light dimmer circuit 264, such as that shown in FIG. 5.

In yet another embodiment, the variable heat source can be provided by a switch 279, such as that shown in FIG. 6, which provides either the full voltage across the light bulb 46 or half of the AC voltage across the light bulb 46. In the preferred embodiment, a 60-watt black light is used.

The operation of the mosquito killing apparatus is as follows: When connected to a source of power, the light bulb 46 is turned on. The light bulb 46 heats the air around the bulb 46. This heated air is in communication with the wick 182 in the liquid 58 in the cup 174. This causes the liquid to evaporate and to mix the mosquito attractant with the heated moist air. Once the heated air reaches the desired operating temperature, the control circuit 66 opens causing the solenoid valve 62 to open and the fan 42 to turn on. Outside air is pulled into the top of the inner shell by the fan 42. through the openings 124. The air is then forced in a downward direction along the inner shell 18. As the air moves along the inner shell 18, it mixes with the $CO_2$ being released by the $CO_2$ line including the solenoid valve 62 and the variable size orifice 234. The air and $CO_2$ mix with the heated air including the insect attractant, and is then forced out through the horizontal openings 38. The warm, heated air including the attractant and $CO_2$ causes mosquitoes in the vicinity to be drawn to the apparatus 10. After the fan 42 operates causing the $CO_2$ and moist air to be ejected from the inner shell 18, the temperature within the inner shell is cooled to where the control circuit 66 again opens. The amount of time the fan is on and the $CO_2$ is released will thus be dependent on both ambient air temperature and the moisture in the air. When the ambient air is cooler, there are fewer mosquitoes and the device 22 will be on less often.

The construction of the inner shell 18 is such that the heated, moist air rises up where it accumulates within the inner shell 18 until the next time the fan 42 begins to operate and the $CO_2$ is allowed to flow. In other less preferred embodiments, openings 26 can be provided over the entire inner shell 18. Also, in other less preferred embodiments, other types of openings (not shown) into the inner shell 18 can be used.

When the bulb 46 burns out, or when the liquid 58 in the cup 174 needs to be replenished, the cup 174 is removed from the lower collar 154. This permits access to both the black light 46 and the cup interior.

What is claimed is:

1. An apparatus for killing insects, the apparatus including:
   electrical means for killing insects,
   an inner shell, the inner shell being surrounded by the electrical means, and
   a mosquito attracting device within the inner shell, the insect attracting device including
   a fan,
   a heat source, and
   a source of $CO_2$,
   with the inner shell having a plurality of openings in the inner shell for ejecting heated air and $CO_2$ from within the inner shell, the openings being formed by indentations in the surface of the inner shell, each indentation being open at one end so as to form an opening which lies substantially perpendicularly to the extending axis of the inner shell.

2. An apparatus according to claim 1 wherein the attracting device further includes means for closing the source of $CO_2$ and for stopping the fan when the temperature within the inner shell goes below said temperature.

3. An apparatus according to claim 2 wherein the means for closing the source of $CO_2$ and for stopping the fan is a circuit including a temperature switch.

4. An apparatus according to claim 1 wherein the insect attracting device further includes:

a moisture source, and an insect attractant.

5. An apparatus according to claim 1 wherein the apparatus further includes:

a roof, means for hanging the apparatus comprising an eye bolt and a locking screw, the eye bolt being secured in a threaded bore in the top of the apparatus, an outer protective shell, means adapted to connect the attracting device to a power supply, and means for catching dead insects.

6. An apparatus according to claim 1 wherein the heat source is a black light bulb.

7. An apparatus for killing insects, the apparatus including:

electrical means for killing insects, an inner shell, the inner shell being surrounded by the electrical means, and a mosquito attracting device within the inner shell, the insect attracting device including a fan, a heat source, and a source of $CO_2$, and the apparatus further including means for opening the source of $CO_2$ and for starting the fan when the temperature within the inner shell reaches a certain temperature.

8. An apparatus according to claim 7 wherein the means for opening the source of $CO_2$ and for starting the fan is a circuit including a temperature switch.

9. An apparatus according to claim 7 wherein the attracting device further includes means for closing the source of $CO_2$ and for stopping the fan when the temperature within the inner shell goes below said temperature.

10. An apparatus according to claim 7 wherein the inner shell has a plurality of openings in the inner shell for ejecting heated air and $CO_2$ from within the inner shell, the openings being formed by indentations in the surface of the inner shell, each indentation being open at one end so as to form an opening which lies substantially perpendicularly to the extending axis of the inner shell.

11. An apparatus according to claim 7 wherein the insect attracting device further includes:

a moisture source, and an insect attractant.

12. An apparatus according to claim 7 wherein the apparatus further includes:

a roof, means for hanging the apparatus comprising an eye bolt and a locking screw, the eye bolt being secured in a threaded bore in the top of the apparatus, an outer protective shell, means adapted to connect the attracting device to a power supply, and means for catching dead insects.

13. An apparatus according to claim 7 wherein the heat source is a black light bulb.

14. An apparatus for killing insects, the apparatus including:

electrical means for killing insects, an inner shell, the inner shell being surrounded by the electrical means, with the inner shell having a plurality of openings in the inner shell for ejecting heated air and $CO_2$ from within the inner shell, the openings being formed by indentations in the surface of the inner shell, each indentation being open at one end so as to form an opening which lies substantially perpendicularly to the extending axis of the inner shell, and a mosquito attracting device within the inner shell, the insect attracting device including a fan, a black light, a source of $CO_2$, means for closing the source of $CO_2$ and for stopping the fan when the temperature within the inner shell goes below said temperature, a moisture source, and an insect attractant.

15. An apparatus according to claim 14 wherein the apparatus further includes:

a roof, means for hanging the apparatus comprising an eye bolt and a locking screw, the eye bolt being secured in a threaded bore in the top of the apparatus, an outer protective shell, means adapted to connect the attracting device to a power supply, and means for catching dead insects.

16. An apparatus according to claim 14 wherein the means for closing the source of $CO_2$ and for stopping the fan is a circuit including a temperature switch.

* * * * *